March 23, 1954     L. E. STEWART     2,673,003

DISPOSABLE COOKING UTENSIL

Filed Feb. 2, 1951

Lawrence E. Stewart,
Inventor,
Koenig and Pope,
Attorneys.

Patented Mar. 23, 1954

2,673,003

UNITED STATES PATENT OFFICE 2,673,003

DISPOSABLE COOKING UTENSIL

Lawrence E. Stewart, University City, Mo.

Application February 2, 1951, Serial No. 209,003

1 Claim. (Cl. 220—72)

This invention relates to disposable cooking utensils, more particularly to disposable broiling or roasting trays or pans made of aluminum foil.

The object of the invention is the provision of a practical and inexpensive broiling or roasting tray or pan made of aluminum foil which, despite being made of such foil, is sufficiently rigid for practical use, and which provides for supporting whatever is being broiled or roasted above the bottom of the pan.

In general, the utensil of this invention consists of a rectangular pan formed from a blank of aluminum foil having a flat bottom and upwardly bent side and end walls. The pan is formed with integral reinforcing ribs extending parallel to one another throughout the length of the pan from the upper edge of one end wall of the pan to the upper edge of the other, each of the ribs having a portion in the form of a ridge extending upward from the bottom of the pan and extending from near one end of the bottom to near the other end of the bottom, and flattened end portions extending from the ends of the ridge up to the upper edges of the end walls. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawing, in which one of various possible embodiments of the invention is illustrated, Fig. 1 is a perspective view of a stack of pans of this invention, with parts broken away;

Similar reference characters indicate corresponding parts throughout the several views of the drawing.

Figure 1:
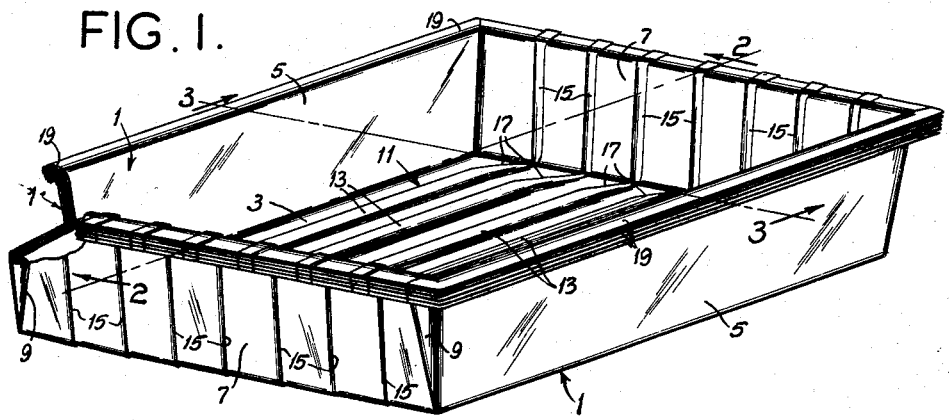
Figure 2:
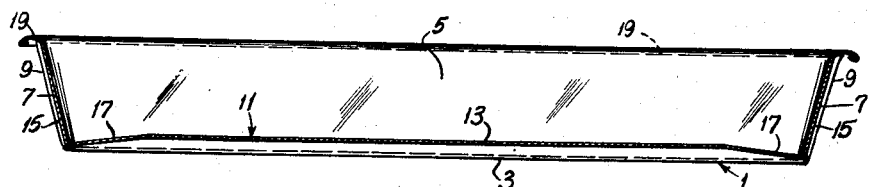
Fig. 2 is a vertical longitudinal section taken on line 2—2 of one of the pans shown in Fig. 1.
Figure 3:
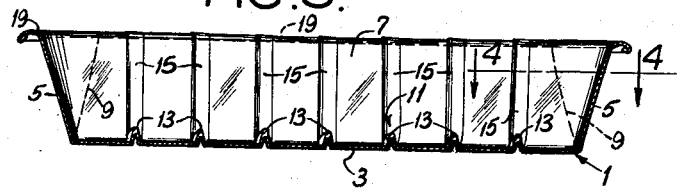
Fig. 3 is a vertical transverse section taken on line 3—3 of one of the pans shown in Fig. 1; and, Fig. 4 is an enlarged fragmentary horizontal section taken on line 4—4 of Fig. 3.

Referring to the drawings, Fig. 1 shows a stack of pans of this invention, each pan being designated 1, showing how a number of pans may be conveniently nested for purposes to be mentioned later. Each pan 1 is of rectangular form, being made from a blank of aluminum foil, and having a flat bottom 3 and upwardly bent side and end walls 5 and 7, respectively. The corners of the pan are closed by folding as indicated at 9. The pan is formed with integral reinforcing ribs 11 extending parallel to one another throughout the length of the pan from the upper edge of one end wall 7 to the upper edge of the other end wall 7. Each rib has a portion in the form of a ridge of generally inverted V-shape in cross section extending upward from the flat bottom 3 throughout a portion of the length of the bottom from near one end of the bottom to near the other end of the bottom, the V-shaped ridge portion of each rib being designated 13, and each rib is flattened in its end portions in the end walls 7 of the pan as indicated at 15. The V-shaped ridge portion 13 of each rib merges into the flattened end portions 15 of each rib via transitions 17, which gradually develop from the V-shape of ridge portion 13 to the flattened cross section of the end portions 15. The upper margins of the sides and ends of the pan are preferably formed with a folded outturned flange, as indicated at 19.

The pan is preferably made of foil from .0015 to .0020 inch thick and may be made of foil from .0010 to .0030 inch thick, for economy. Such foil is thick enough that when the reinforcing ribs are provided as above described, the pan is adequately rigid for practical use. In some instances where a particularly heavy cut of meat is to be broiled or roasted, a nested stack of pans, such as shown in Fig. 1, may be used. After such use, only the top pan need be discarded. A large number of the pans may also be packaged and sold and kept in a nested stack. It will be seen that the ridge portions 13 of the ribs 11 will hold whatever is being broiled or roasted above the flat bottom 3 of the pan, as is desirable.

In manufacturing the pans, it is contemplated that they be made by forming V-shaped ribs or ridges lengthwise in a continuous strip of aluminum foil of the width required for the pans. This may be accomplished by feeding the strips through corrugating rolls, or in any other suitable way. Then the ribs are flattened at intervals spaced throughout the length of the strip corresponding to the length of the individual pans and the strip is segmented across the portions where the ribs are flattened to provide individual flat rectangular blanks each of which has the V-shaped ridges 13 extending from near one end to near the other end and merging via transitions 17 into the flattened rib portions 15 at the ends. Then the sides and ends of the blank are bent up to form the side and end walls of the pan with ridges 13 on the inside of the pan, and the corners are folded as indicated at 9. It will be understood that the flattening of the ribs at the two ends of the blank makes it possible readily to bend up the end walls, the foil being more readily bent where the ribs are flattened.

Figure 4:
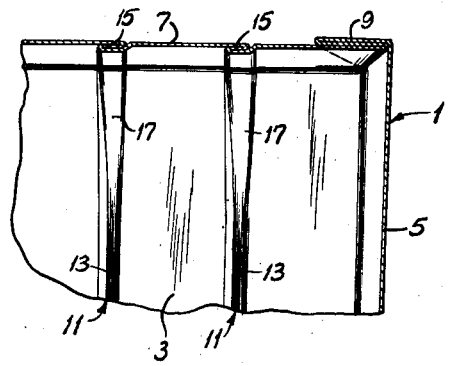

While the drawings illustrate all the ribs 11 as being flattened with regularity (i. e., all the end portions of the ribs are flattened in exactly the same manner), it will be understood that the flattening may be irregular or indiscriminate. For example, instead of having all the ribs folded down toward one side of the pan (see Fig. 4), some may be flattened toward one side and some toward the other, or each rib may have part folded toward one side and part toward the other.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

A disposable cooking pan made of a blank of aluminum foil folded to have a generally flat rectangular bottom and upwardly extending side and end walls, the pan having integral reinforcing ribs extending parallel to one another continuously from the upper edge of one end wall down said one end wall to the fold line on which said one end wall is folded up, all along the bottom from said fold line to the fold line on which the other end wall is folded up, and from the latter fold line up the said other end wall to the upper edge thereof, the end portions of each rib which extend from the upper edges of the end walls to the fold lines where the end walls are folded up each consisting of an integral plait-like portion of the foil flattened upon itself on the inside of the end wall, each rib also having a portion in the form of a ridge generally of inverted V-shape in cross section extending upward from the bottom of the pan and reaching from near one end of the bottom to near the other end of the bottom; and each rib also having transition sections extending from the ends of the V-shaped ridge portion to the lower ends of the plait-like portions, said transition sections developing gradually from the inverted V-shape of the ridge portion to the flattened plait-like form of the end portions of the rib, and attaining the flattened plait-like form at the fold lines where the end walls are folded up.

LAWRENCE E. STEWART.

References Cited in the file of this patent

UNITED STATES PATENTS

| Number | Name | Date |
| --- | --- | --- |
| 313,092 | Mayes | Mar. 3, 1885 |
| 354,572 | Norton | Dec. 21, 1886 |
| 623,964 | Avery | May 2, 1899 |
| 642,507 | Topping | Jan. 30, 1900 |
| 1,255,237 | Sevigne | Feb. 5, 1918 |
| 1,529,072 | Lennox | Mar. 10, 1925 |
| 1,600,055 | Meyer | Sept. 14, 1926 |
| 2,170,040 | Stuart | Aug. 22, 1939 |
| 2,226,155 | Bjornson | Dec. 24, 1940 |
| 2,573,524 | Weisberg et al. | Oct. 30, 1951 |